(12) United States Patent  (10) Patent No.: US 7,917,723 B2
Wooten  (45) Date of Patent: Mar. 29, 2011

(54) ADDRESS TRANSLATION TABLE SYNCHRONIZATION

(75) Inventor: David R. Wooten, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 604 days.

(21) Appl. No.: 11/291,726

(22) Filed: Dec. 1, 2005

(65) Prior Publication Data

US 2007/0130441 A1  Jun. 7, 2007

(51) Int. Cl.
*G06F 12/00* (2006.01)

(52) U.S. Cl. ........ 711/206; 711/202; 711/203; 711/205; 711/E12.059; 711/E12.014; 711/E12.058

(58) Field of Classification Search .................... None
See application file for complete search history.

(56) References Cited

U.S. PATENT DOCUMENTS

| 5,604,864 | A | * | 2/1997 | Noda | 714/47 |
| 6,163,806 | A | * | 12/2000 | Viswanathan et al. | 709/229 |
| 6,446,188 | B1 | * | 9/2002 | Henderson et al. | 711/206 |
| 2002/0152428 | A1 | * | 10/2002 | James et al. | 714/42 |
| 2005/0050295 | A1 | * | 3/2005 | Noel et al. | 711/206 |
| 2005/0097384 | A1 | * | 5/2005 | Uehara et al. | 714/1 |
| 2006/0161723 | A1 | * | 7/2006 | Sena et al. | 711/103 |

* cited by examiner

*Primary Examiner* — Reginald G Bragdon
*Assistant Examiner* — Baboucarr Faal
(74) *Attorney, Agent, or Firm* — Woodcock Washburn LLP

(57) ABSTRACT

A system, method and computer-readable medium for updating an address translation table. In the method, a message indicating a physical memory location that corresponds to a virtual address is received from a processor. An I/O Memory Management Unit (IOMMU) is used to update an entry within the address translation table corresponding to the virtual address according to the indicated physical memory location.

15 Claims, 6 Drawing Sheets

ADDRESS TRANSLATION TABLE SYNCHRONIZATION

BACKGROUND

Translation tables are used in computing systems to provide an interface between a device, such as an Input/Output (I/O) device, and the central core of the computing system. For example, an I/O device may be assigned a set of virtual addresses it may use for accessing resources provided by the computing system. The virtual addresses are independent of the actual, physical memory locations of the resources in the computing system. In such a manner, the I/O device does not need to be updated any time there is a change within the computing system. Instead, when the I/O device requests to access a particular resource, it simply presents the assigned virtual address in its request. An I/O Memory Management Unit (IOMMU) receives the request from the I/O device and translates the virtual address into the physical memory location of the resource.

To accomplish this task, the IOMMU uses one or more address translation tables. An address translation table stores entries that provide a location of a physical memory page. The tables are indexed using high-order bits of the virtual address from the I/O device. Thus, when the request to access a system resource is received, the IOMMU can access the appropriate entry in the address translation table to complete the request. Address translation tables are maintained by a processor of the computer system. That is, the processor has read and write access to the translation table, while the IOMMU and any other devices that use the table, if present, have only read access.

Address translation tables can be very large, and are typically constructed as a series of tables arranged in a tree format. In this tree format, an entry in a table may point to another table, which in turn may point to another table, and so on, until a "leaf" level is reached. The leaf level is the point in the tree at which the appropriate physical memory location, or a pointer to the location, is stored. The process of following these pointers to the leaf level, called "walking" the tree, takes up valuable processing time due to the complexity involved with the process of walking through all of the necessary levels of the tree to reach the appropriate leaf level, particularly if the table is very large. Because some physical memory locations are accessed repeatedly, a cache is typically used to store entries for such frequently-accessed locations. Thus, upon receiving an I/O device request to access a computer resource, the IOMMU first checks the cache to determine whether an entry corresponding to the requested virtual address is present. If the entry is present, the IOMMU acquires the physical memory location from the cache entry, thereby avoiding walking the tree. If the entry is not present, the IOMMU walks the tree to find the appropriate entry and, upon finding the entry, uses the physical address to complete the access and may also create a cache entry to avoid walking the tree in the future.

Sometimes the physical memory location that is associated with virtual address is changed. In such a situation, the address translation table entry that associates the virtual address with the old physical memory location is changed to point to the new physical memory location. Because, conventionally, the processor is the only component that is permitted to write to an address translation table, the processor makes the change to the appropriate entry. If the entry has been stored in a cache, the processor generates a message containing a virtual address or a range of virtual addresses corresponding to the entry to the IOMMU, and an indication that the cache entry must be deleted. The IOMMU then flushes the indicated entry from the cache. When a request is subsequently received for the virtual address, the IOMMU will check the cache, find that the entry is not present, and then walk the address translation table to find the entry. The IOMMU may also save the new entry to the cache.

There are several shortcomings associated with the conventional mechanism for handling address translation tables. For example, because the IOMMU is only able to read from an address translation table, the information the IOMMU is able to provide to other components is limited to that which is provided by the processor. In some situations, it may be useful to store additional information in the address translation table that the IOMMU could use for performance tracking and other purposes. Because the processor maintains the tables, however, the IOMMU is not able to do this because the processor and the IOMMU are not in the same coherency domain. That is, any changes made by the IOMMU could result in a conflict with those made by the processor, which could cause serious faults in the system. Having the processor maintain such additional information would unduly burden the processor with additional workload and adversely affect system performance.

In addition, the conventional update mechanism is inefficient. For example, when the processor sends a message to the IOMMU indicating that a cache entry has been changed, the processor only provides sufficient information for the IOMMU to delete the cache entry. The IOMMU must then walk through the address translation table the next time the virtual address associated with the entry is presented, which is time consuming. In addition, if a cache entry of the new address is desired, the IOMMU must create a new cache entry in an operation that is separate from the cache entry delete operation.

SUMMARY

An embodiment of the present invention provides a system, method and computer-readable medium for maintaining an address translation table using an IOMMU. In such an embodiment, upon a change to one or more physical memory locations that are associated with an entry in an address translation table, the processor passes a message to the IOMMU. The message identifies the affected entry and a new physical memory location associated with the entry. The IOMMU then updates the entry in the address translation table and a corresponding entry in a cache, if present.

If the changed physical memory location necessitates a change to a branch of the address translation table's tree structure, the processor prepares a new branch prior to sending the message to the IOMMU. The message may include the new physical memory location and a first pointer for the new branch. The IOMMU then updates the corresponding cache entry, if present, with the new physical memory location, and a first entry in the address translation table with the first pointer to the new branch. In such a manner, the old branch is bypassed and the new branch is added to the address translation table.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

DETAILED DESCRIPTION

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Example Computing Environment

Figure 1:
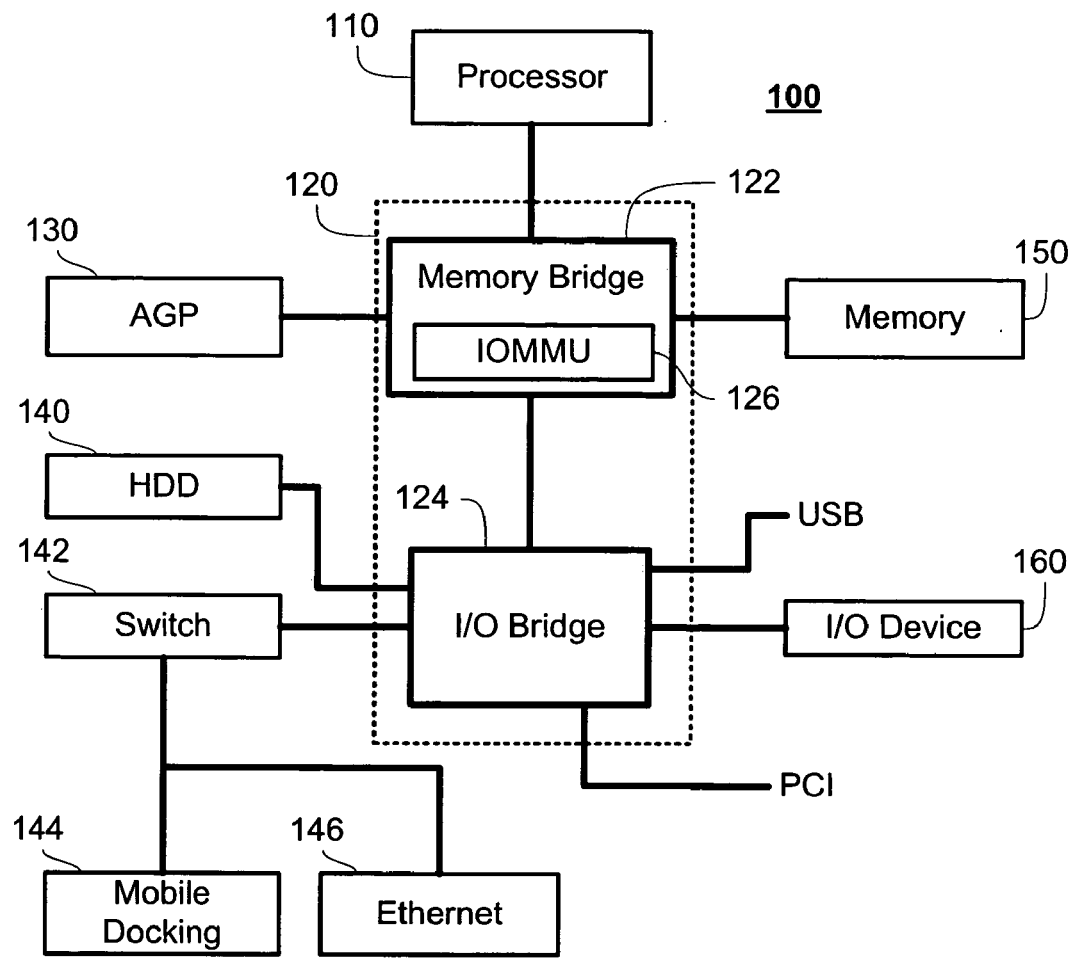
FIG. 1 is a diagram illustrating an example computing environment in which aspects of the invention may be implemented.

FIG. 1 illustrates example computing system environment 100 in which aspects of the invention may be implemented. Computing environment 100 may correspond to, for example, a Northbridge/Southbridge chipset computer architecture in which split-transaction semantics are enabled. However, the computing environment 100 is only one example of a suitable computing environment and is not intended to suggest any limitation as to the scope of use or functionality of the invention. Neither should computing environment 100 be interpreted as having any dependency or requirement relating to any one or combination of components illustrated in the example computing environment 100.

Embodiments are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

Computing environment 100 typically includes a variety of computer readable media. Computer readable media can be any available media that can be accessed by environment 100 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computing environment 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Processor 110 may be a programmable logic device that performs instruction, logic and mathematical processing. Processor 110 is operatively connected to chipset 120. Chipset 120 is a collection of microchips that perform functions in support of processor 110. For example, chipset 120 may include memory bridge 122 and I/O bridge 124. Memory bridge 122 communicates with processor 110 and controls interaction with memory 150 and Accelerated Graphics Port (AGP) 130 activities. Memory bridge 122 includes IOMMU 126, which intercepts memory accesses from I/O devices (e.g., devices and buses that are operatively connected to I/O bridge 124) so as to translate virtual addresses into the appropriate memory location. IOMMU 126 may be configured in any manner. For example, instead of a single IOMMU 126, memory bridge 122 may include a plurality of IOMMUs 126, such as an IOMMU 126 that is dedicated to translating memory accesses from AGP 130 and a second IOMMU 126 that is dedicated to translating memory accesses from the I/O bridge 124. Any such configuration is consistent with an embodiment. Memory 150 may include computer storage media in the form of volatile and/or non-volatile memory such as ROM and RAM. For example, RAM typically contains data and/or program modules that are immediately accessible to and/or presently being operated on by processor 110.

I/O bridge 124 implements the relatively slower capabilities of computing environment 100. As can be seen in FIG. 1, I/O bridge 124 is operatively connected to processor 110 by way of memory bridge 122. A non-exhaustive listing of components that be implemented by I/O bridge 124 include hard disk drive 140, switch 142, USB and PCI buses, and I/O device 160. Hard disk drive 140 provides storage of computer readable instructions, data structures, program modules and other data for computing environment 100. Switch 142 enables I/O bridge 124 to communicate with a variety of I/O endpoints, such as mobile docking port 144 and Ethernet port 146, for example. I/O bridge 124 may also implement a PCI or USB bus. In addition, I/O bridge 124 may implement any type of I/O Device 160.

As noted above, computing environment 100 may reside within a variety of different types of computing devices. Accordingly, computing environment 100 may further include components, devices, and the like that are not illustrated in FIG. 1 for clarity. Furthermore, some components that are illustrated separately in FIG. 1 may, in fact, have their functionality implemented by a single hardware component. For example, the functions of switch 142 and I/O bridge 124 may be performed by a single component.

Example Embodiments

Figure 2A:
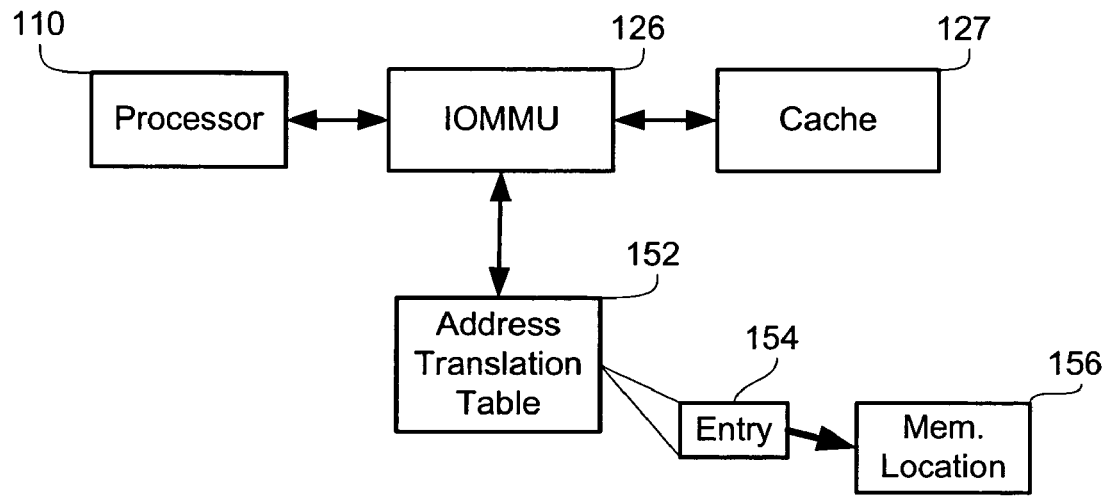
FIG. 2A is a diagram illustrating an environment in which an example mechanism for updating an address translation table in accordance with an embodiment of the invention may be implemented.

In the discussion that follows, it is assumed herein that one skilled in the art is familiar with processor code and the operation of I/O Memory Management Units (IOMMUs), and therefore details relating to such matters are omitted herein for clarity. FIG. 2A is a diagram illustrating an environment in which an example mechanism for updating an address translation table in accordance with an embodiment may be implemented. As can be seen, processor 110 is in operative communications with I/O Memory Management Unit (IOMMU) 126. Processor 110 communicates with IOMMU 126 using any type or format of inter-device communication. IOMMU 126 may be any type of hardware device or circuit that supports the use of virtual memory by providing a mechanism for translating a virtual address into a corresponding physical memory location.

Address translation table 152 is operatively connected to IOMMU 126. Address translation table 152 may be part of memory 150, for example, and contains at least one entry 154 that references physical memory location 156 associated with a virtual address (physical memory location 156 normally references a range of memory locations often referred to as a "page"). Entry 154 may indicate physical memory location 156 in any number of ways. For example, entry 154 may simply include physical memory location 156 itself, or may use some other method such as, for example, a pointer in the form of several high-order bits or the like, an offset, etc. The discussion herein refers to a "pointer" in its broadest sense, meaning any type of data construct that leads, using any mechanism, to a location of data.

Cache 127 is a store of physical memory locations 156 that may be referenced by way of their corresponding virtual address. Cache 127 may be any type of rapid-access memory structure such as, for example, an IOTLB. It will be appreciated that instead of storing the entire virtual address or physical memory location 156, a hash or other type of compressed data shorthand mechanism may be employed. The format of the data stored may be the same as or different than that used in address translation table 152. For example, address translation table may indicate physical memory location 156 using a pointer, while cache 127 may use some other means for indicating physical memory location 156. In any event, cache 127 provides IOMMU 126 with a mechanism by which address translation table 152 need not be used to look up a physical memory location that corresponds to a particular virtual address. For example, the first time a particular virtual address is presented to IOMMU 126 (e.g., as part of a request from an I/O device or the like), a corresponding physical memory location 156 may not be present in cache 127. As a result, IOMMU 126 must access address translation table 152 to locate physical memory location 156. As will be discussed below in connection with FIGS. 3A-C, when entries 154 in address translation table 152 are arranged as a large tree, the processing time involved with walking through the tree to reach the appropriate physical memory location 156 may be substantial. Thus, in connection with returning a result, IOMMU 126 stores the ultimate physical memory location 156 (or a pointer to said location 156, or the like). As a result, subsequent requests for the physical memory location 156 corresponding to the virtual address can be serviced quickly.

In an embodiment, IOMMU 126 is provided with write access to address translation table 152, and processor 110 does not write to address translation table 152. Such a configuration may be implemented using any type of hardware or software modification to processor 110 (to prevent it from modifying address translation table 152) and IOMMU 126 (to enable it to modify address translation table 152). For example, processor 110 code that carries out a write to address translation table 152 may be bypassed such that processor 110 no longer writes to address translation table 126. A setting change or the like may be made to IOMMU 126 such that write access to address translation table 126 is enabled. Code or the like may be written for IOMMU 126 such that IOMMU 126 is able to write to address translation table 152 to update entries 154. IOMMU 126 may also be programmed to store additional information in address translation table 152 such as, for example, performance information (e.g., use counts, record status, etc.) and the like.

Figure 2B:
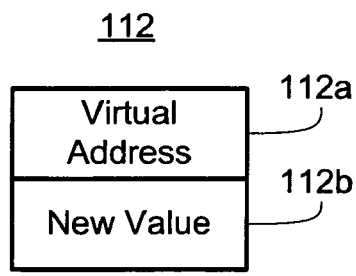
FIG. 2B is a diagram illustrating an example processor message according to an embodiment.

FIG. 2B is a diagram illustrating an example processor message according to an embodiment. In an embodiment, message 112 is generated by processor 110 and sent to IOMMU 126 when a physical memory location 156 corresponding to a particular virtual address or the like has been changed. Message 112 contains an virtual address identifier 112a—which may be the virtual address itself or some other representation, such as a hash, pointer or the like—and a new value entry 112b indicating the new physical memory location 156. In such a manner, therefore, an embodiment provides IOMMU 126 with sufficient information to update cache 127 with new value 112b. Thus, upon a subsequent request for the virtual address, IOMMU 126 will be able to avoid walking through address translation table 152 and will be able to simply access cache 127. It will also be appreciated that by providing the new value 112b, message 112 enables IOMMU 126 to update address translation table 152. Although not shown in FIG. 2B, message 112 may also contain one or more additional entries or other fields. For example, message 112 may include an indication of the operation to be performed such as, for example, an indication that a new entry 154 needs to be created, that an existing entry is to be updated, or the like.

Figure 2C:
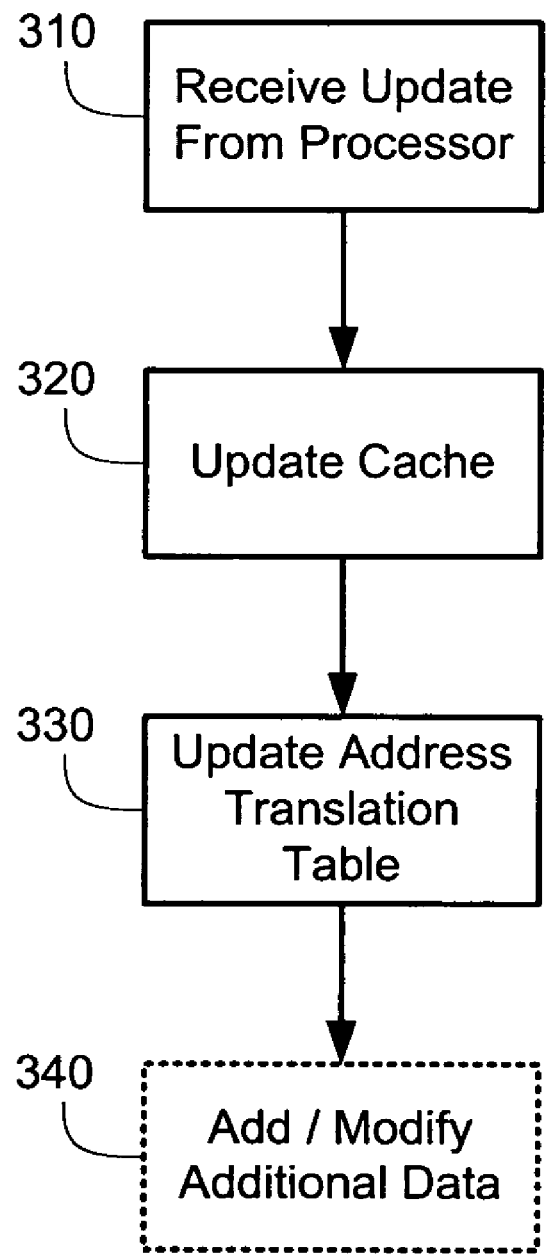
FIG. 2C is a flowchart illustrating an example method of updating an address translation table according to an embodiment.

FIG. 2C is a flowchart illustrating an example method 300a of updating an address translation table according to an embodiment. References are also made to FIGS. 2A-B as appropriate. At step 310, an update message 112 from processor 110 is received by IOMMU 126. In an embodiment, message 112 may be configured as indicated above in connection with FIG. 2B. In other embodiments message 112 may contain additional or alternate entries. For example, in an embodiment, message 112 may contain numerous virtual address 112*a* and new value 112*b* entries so as to enable a batch of memory locations to be updated using a single message 112. In another embodiment, message 112 may have one virtual address 112*a* and a series of physical memory locations in one or more entries 112*b*, which can be used by IOMMU 126 to update a range of virtual addresses.

At step 320, IOMMU 126 updates cache 127 with the new value represented by new value entry 112*b*. Step 320 may simply involve clearing a pre-existing entry and entering the new value, or may involve any number of steps, depending on the particular configuration of cache 127 being used. It will be appreciated that step 320 may be skipped if no cache 127 entry exists for the given virtual address.

At step 330, IOMMU 126 updates entry 154 of address translation table 152 with the new value represented by new value entry 112*b*. It will be appreciated that in updating address translation table 152 IOMMU 126 may need to walk through the table 152, as will be discussed below in connection with FIGS. 3A-C, to reach the appropriate entry to change. In one embodiment, steps 320 and 330 may be performed atomically.

At optional step 340, IOMMU 126 may add, modify or delete additional data within address translation table 152. For example, IOMMU 126 could include additional entries 154 within address translation table 152 that pertain to performance data and the like. Step 340 may take place in connection with steps 310-330, or may be a stand-alone step that may be taken at any time.

Figure 3A:
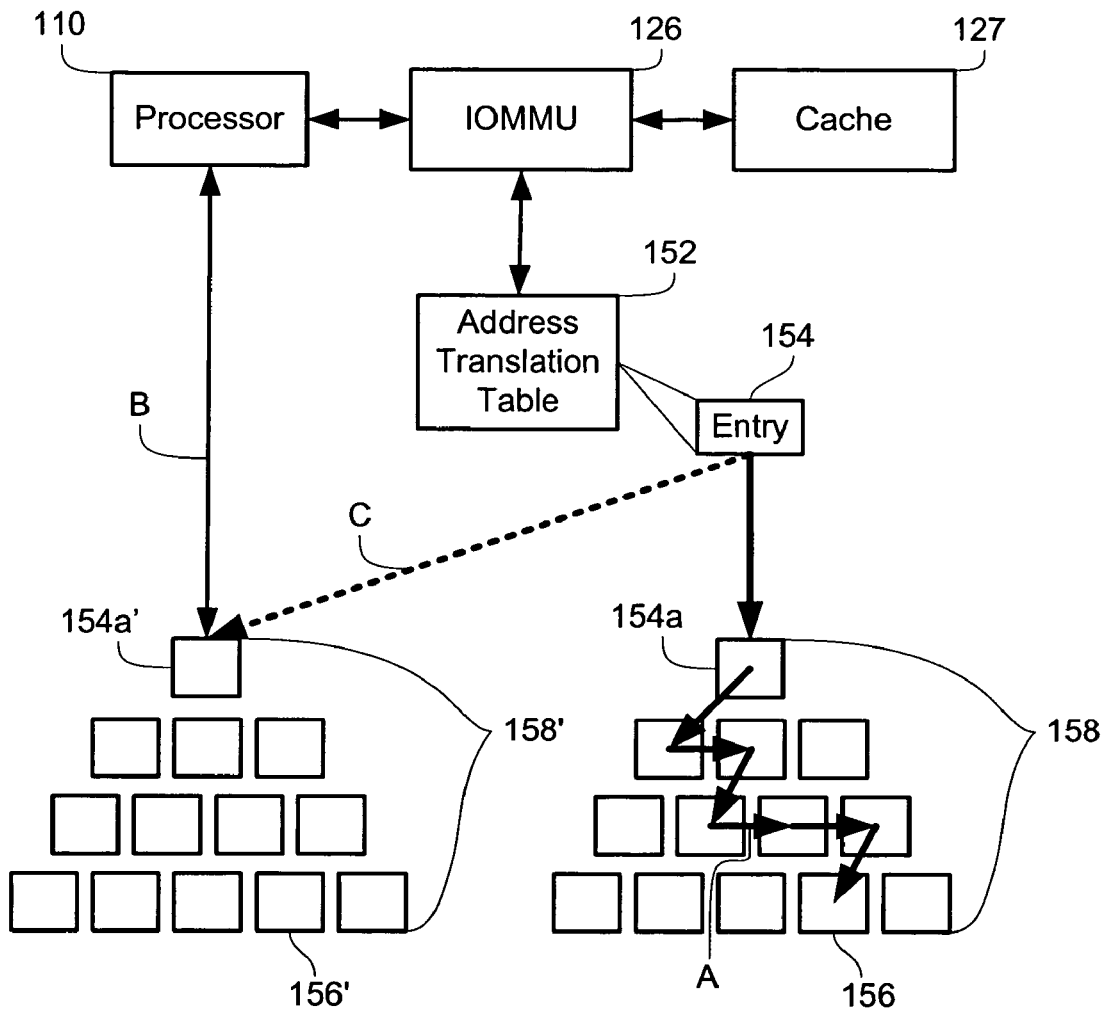
FIG. 3A is a diagram illustrating an environment in which an example mechanism for updating an address translation table in accordance with an embodiment of the invention may be implemented.

FIG. 3A is a diagram illustrating an environment in which an example mechanism for updating an address translation table in accordance with an embodiment may be implemented. In contrast to the environment of FIG. 2A, discussed above, entry 154 of address translation table 152 does not lead directly to physical memory location 156. Instead, entry 154 may contain a pointer that leads to another entry 154*a* within tree 158. Tree 158 may correspond to a part (i.e., a "branch") of address translation table 152's tree structure of entries 154-154*a*, or to the entire tree structure, for example. The structure of tree 158 is illustrated functionally, that is, the arrangement of entries 154-154*a* of tree 158 is depicted to show the relationship between entries 154-154*a* within tree 158. Furthermore, each entry 154-154*a* may itself be a table or other data structure. Any type of pointer may be used such as, for example, high-order bits of entry 154*a* or the like. Ultimately, by following the pointers—or "walking"—through entries 154*a* of tree 158, an example of which is illustrated as the series of arrows labeled A, physical memory location 156 may be located. For example, within the appropriate entry 154*a* of the last level of tree 158, a pointer may point to a physical page (e.g., physical memory location 156) that is indexed by a byte offset within that page, for example. As noted above, cache 127 contains the ultimate physical memory location 156 (or a pointer to physical memory location 156 as noted above, or the like), thereby shortening the amount of time IOMMU 126 takes to obtain physical memory location 156.

Figure 3B:
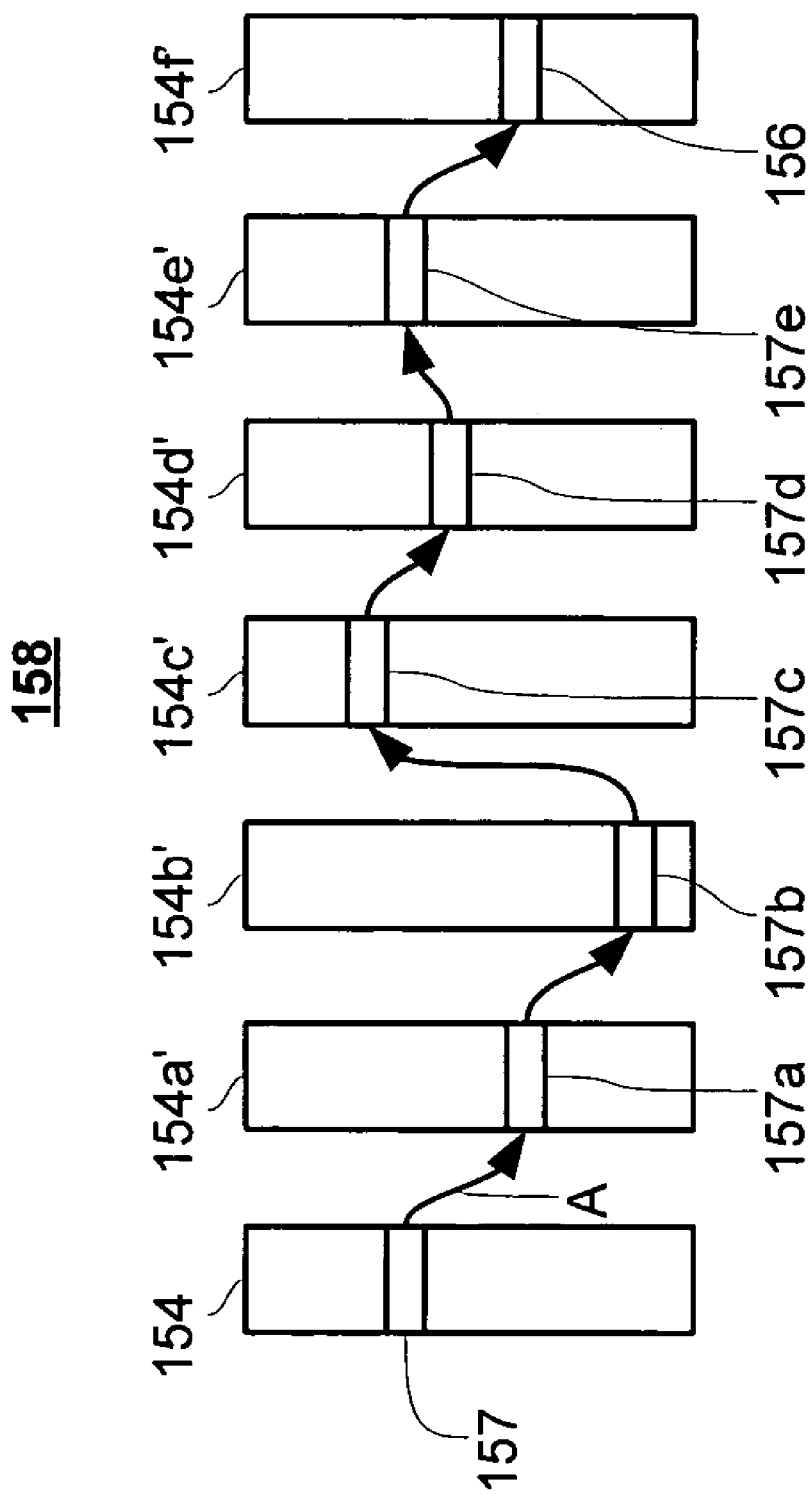
FIG. 3B is a diagram illustrating an example table walk which may be performed in connection with one embodiment of the invention.

FIG. 3B illustrates a walk of a tree in greater detail. In an embodiment, the accessing of physical memory address 156 is broken down into successive steps. At each step, some number of high-order address bits are used to index (or "point") to an entry 154 referenced by the previous level. Using 4 kb pages and 64-bit entries as an example, a page of memory may contain 512 entries so 9 bits of address may be used to index at each level. In FIG. 3B, therefore, pointer 157 of entry 154 points to pointer 157*a* of entry 154*a*', as illustrated by arrow A. Likewise, pointer 157*a* of entry 154*a*' points to pointer 157*b* of entry 154*b*', and so on, until pointer 157*e* of entry 154*e*' points to physical memory location 156, which is located in entry 154*f*'. It should be appreciated that the number of entries 154-154*f* illustrated in FIG. 3B is for purposes of explanation only, and any number of such entries 154-154*f*', may be used in connection with an embodiment.

Figure 3C:
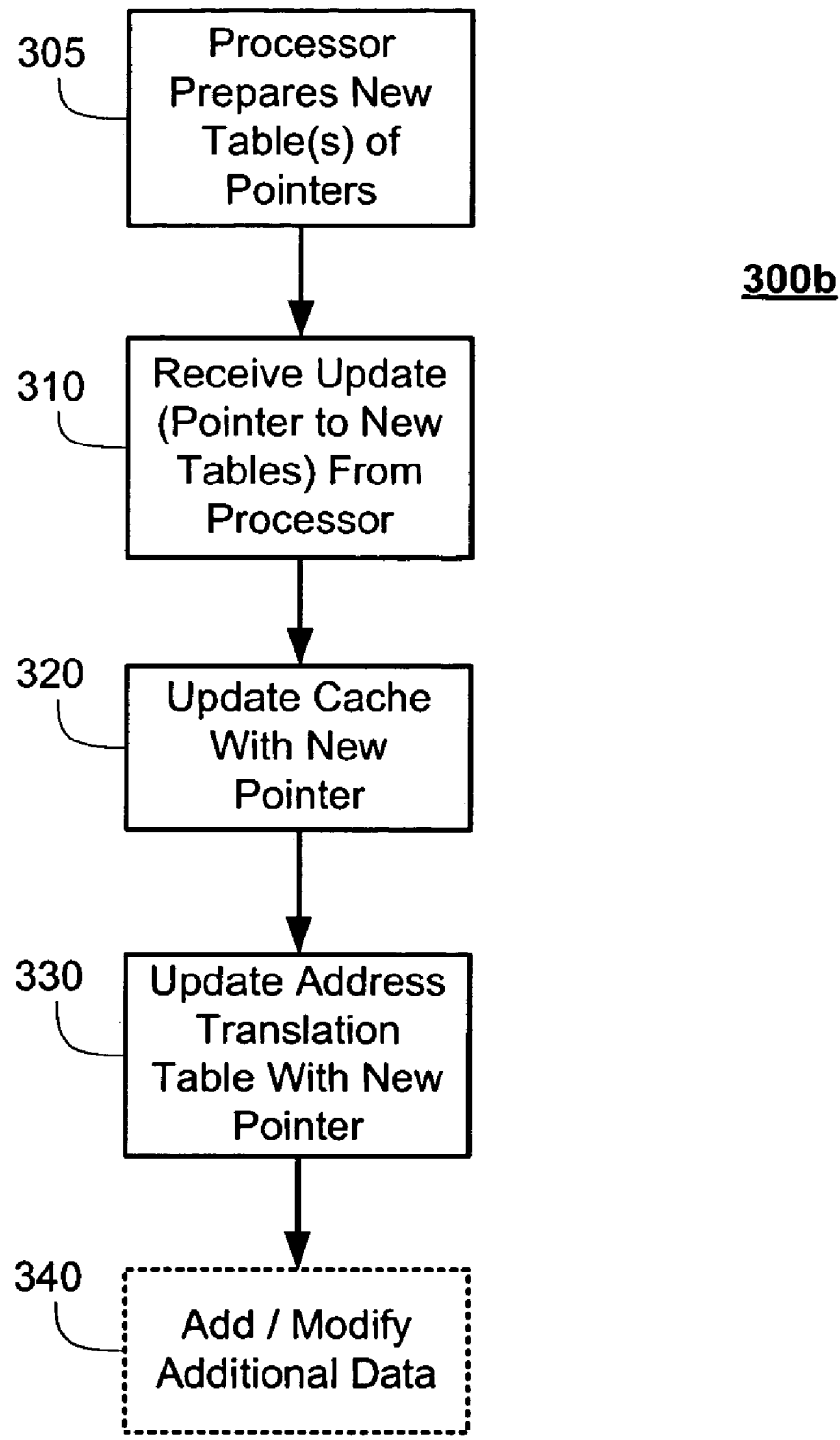
FIG. 3C is a flowchart illustrating an example method of updating an address translation table according to an embodiment.

FIG. 3C is a flowchart illustrating an example method 300*b* of updating address translation table 152, according to an embodiment. References are also made to FIGS. 2B and 3A as appropriate. In an embodiment, method 300*b* occurs when a change to tree 158 needs to be made to reflect one or more changes to entries 154*a* and/or physical memory location 156. In such an embodiment, tree 158 is replaced by new tree 158'. At step 305, therefore, processor 110 prepares and stores new tree 158', which may include one or more new entries 154*a*' and/or physical memory location 156'. The creation of new tree 158' by processor 110 is represented in FIG. 3A by arrow B.

At step 310, an update message 112 from processor 110 is received by IOMMU 126. As was discussed above in connection with FIG. 2C, message 112 may be configured as indicated above in connection with FIG. 2B. In an embodiment, message 112 includes virtual address 112*a* and new value entry 112*b*. Once entry 154 is updated with the new value represented by new entry 112*b* (to be discussed below), therefore, it will refer to entry 154*a*' of new tree 158' instead of entry 154*a* of tree 158, which is represented in FIG. 3A by arrow C.

At step 320, IOMMU 126 updates cache 127 with the new value represented by new value entry 112*b*. Step 320 may simply involve clearing a pre-existing entry and entering the new value, or may involve any number of steps, depending on the particular configuration of cache 127 being used. At step 330, IOMMU 126 updates entry 154 of address translation table 152 with the new value represented by new value entry 112*b*.

It will be appreciated that method 300*b* provides a mechanism by which tree 158 may be updated to tree 158' in one operation (e.g., steps 320-330). In such a manner, processor 110 may take as much time as necessary to create 158' (which may be done by creating an entirely new tree, or by using parts of tree 158, for example), and then can send message 112 to IOMMU 126 to have the change over occur in one operation. It can be seen that, in an embodiment, IOMMU 126 need only update entry 154 with the new value contained in new value entry 112*b* to switch from tree 158 to tree 158'. Once the new value has been added to entry 154, entry 154 points to tree 158' (as represented in FIG. 3A by arrow C), and then any pointers in entries 154*a*' will ultimately lead to physical memory location 156'. Such a mechanism provides a complete switch to new tree 158' and therefore may avoid deleterious coherency issues. Old tree 158 may be deleted, allowed to be overwritten, or the like.

As was the case in method 300*a* of FIG. 2C, at optional step 340, IOMMU 126 may add, modify or delete additional data within address translation table 152. For example, IOMMU 126 could include additional entries 154 within address translation table 152 that pertain to performance data and the like. Step 340 may take place in connection with steps 310-330, or may be a stand-alone step that may be taken at any time.

While the above examples involve updating existing entries and the like with new values, it should be appreciated that embodiments may involve the creation of entirely new entries 154 and/or trees 158. For example, new virtual addresses or physical memory locations 156 may be created, which may necessitate new entries 154 and/or trees 158. In an embodiment, all changes to address translation table 152 are run through IOMMU 126 in the manner described herein. In such an embodiment, other computer components—including processor 110—are only allowed to read from address translation table 152 to avoid coherency problems. It will be appreciated that in typical computer systems, processor 110 may retain "permission" to write to any memory location, including address translation table 152, because processors generally have access to all system resources. Nevertheless, in an embodiment, processor 110 should be instructed not to do so through processor code sequence changes and the like.

While the present invention has been described in connection with the embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A computer system, comprising:
   an address translation table that maps a plurality of physical memory locations to corresponding virtual address and has an entry, wherein the entry indicates a first physical memory location that corresponds to a virtual address;
   a processor that when operational generates a message, wherein the message indicates a second physical memory location and the virtual address to which it corresponds;
   an memory management unit (MMU) that communicates with the processor when the system is operational, said MMU comprising a cache containing at least one of the physical memory locations to corresponding virtual address translations stored in the address translation table and that, when operational, receives the message from the processor and directly updates the entry in the address translation table to indicate the second physical memory location thereby relieving the processor from the task of updating the address translation table; and
   a tree structure located within the address translation table, wherein the tree structure comprises a first intermediate entry that indicates the first physical memory location, and a second intermediate entry that has a pointer to the first intermediate entry wherein the tree structure is a first tree structure, and wherein the processor creates a second tree structure comprising a first intermediate entry that has a pointer to the second physical memory location, and a second intermediate entry that has a pointer to the first intermediate entry of the second tree structure.

2. The computer system of claim 1, wherein the cache indicates the first physical memory location, and wherein the MMU updates the cache to indicate the second physical memory location.

3. The computer system of claim 2, wherein said cache and said address translation table indicate the second physical memory location by providing a pointer to the second physical memory location.

4. The computer system of claim 1, wherein the message indicates the second physical memory location by providing a pointer to the second intermediate entry of the second tree structure.

5. The computer system of claim 4, further comprising a cache that indicates the first physical memory location, and wherein the MMU updates the cache to indicate the second physical memory location.

6. The computer system of claim 1, wherein the MMU stores information in the address translation table.

7. A method of updating an address translation table, comprising:
   receiving a message from a processor, wherein the message indicates a physical memory location that corresponds to a virtual address; and
   offloading the task from the processor updating the address translation table by updating, using an memory management unit (MMU) that maintains a cache that also contains a physical memory location that corresponds to a virtual address, an entry within the address translation table corresponding to the virtual address according to the indicated physical memory location;
   wherein the address translation table comprises a tree structure having a first intermediate entry that corresponds to the virtual address, and a second intermediate entry that has a pointer to the first intermediate entry wherein the tree structure is a first tree structure, and further comprising creating, using the processor, a second tree structure comprising a first intermediate entry that that corresponds to the virtual address and the indicated physical memory location, and a second intermediate entry that has a pointer to the first intermediate entry of the second tree structure.

8. The method of claim 7, further comprising updating, using the MMU, the cache according to the indicated physical memory location.

9. The method of claim 7, wherein the message indicates the physical memory location by providing a pointer to the second intermediate entry of the second tree structure, and wherein said updating step comprises updating the entry within the address translation table with the pointer to the second intermediate entry of the second tree structure.

10. The method of claim 9, further comprising updating, using the MMU, a cache that includes a pointer to the second intermediate entry of the first tree structure with the pointer to the second intermediate entry of the second tree structure.

11. The method of claim 7, further comprising storing, using the MMU, information in the address translation table.

12. The method of claim 7, wherein said updating step comprises creating an association between the indicated physical memory location and the virtual address.

13. A computer-readable storage medium having computer-executable instructions for performing a method of updating an address translation table, the method comprising:
   receiving a message from a processor, wherein the message indicates a physical memory location that corresponds to a virtual address; and
   offloading the task from the processor updating the address translation table by updating, using an Memory Management Unit (MMU) that maintains a cache that also contains a physical memory location that corresponds to a virtual address, an entry within the address translation table corresponding to the virtual address according to the indicated physical memory location;
   wherein the address translation table comprises a first tree structure having a first intermediate entry that corresponds to the virtual address, and a second intermediate entry that has a pointer to the first intermediate entry, and wherein the method further comprises:
   creating, using the processor, a second tree structure comprising a first intermediate entry that corresponds to the virtual address and the indicated physical memory location, and a second intermediate entry that has a pointer to the first intermediate entry of the second tree structure.

14. The computer-readable storage medium of claim 13, wherein the message indicates the physical memory location providing a pointer to the second intermediate entry of the second tree structure, wherein said updating step comprises updating the entry within the address translation table with the pointer to the second intermediate entry of the second tree structure, and wherein the method further comprises:

updating, using the MMU, a cache that includes a pointer to the second intermediate entry of the first tree structure with the pointer to the second intermediate entry of the second tree structure.

15. The computer-readable storage medium of claim 13, wherein the method further comprises updating, using the MMU, the cache according to the indicated physical memory location.

* * * * *